Patented Feb. 11, 1930

1,746,781

UNITED STATES PATENT OFFICE

WILBUR A. LAZIER, OF WILMINGTON, DELAWARE, ASSIGNOR TO E. I. DU PONT DE NEMOURS & COMPANY, OF WILMINGTON, DELAWARE, A CORPORATION OF DELAWARE

CATALYST AND CATALYTIC PROCESS

No Drawing.  Application filed April 8, 1926. Serial No. 100,712.

This invention relates to catalysts for use in various catalytic processes, such as the synthetic production of methanol and like organic compounds; and it comprises oxide, carbonate or metallic catalysts or mixtures of the same, formed by the thermal decomposition of an oxalate or a mixture of oxalates.

It is well known that in order to prepare metals, oxides, and carbonates for catalytic purposes, special methods must be employed which will yield products having an extensive surface and a considerable porosity to gas penetration. The usual procedure for the preparation of catalytically active metals consists in reducing the oxides of the metals in question either alone or in admixtures at relatively low temperatures in an atmosphere of hydrogen or other gaseous or vaporous reducing agents. For the preparation of oxide catalysts, the usual method consists essentially in calcination of the corresponding hydroxides, carbonates, or nitrates, the hydroxides and carbonates usually being prepared by precipitation. Organic salts, including oxalates, have been used for the preparation of catalysts but, as prepared, the catalysts, in general, have possessed no special merit. Such salts have usually been reduced by hydrogen, in which case the oxalate has no advantage over other organic salts. For the preparation of oil hydrogenation catalysts, the salts have been reduced in contact with the oil to be hydrogenated.

According to my invention, finely divided metals, oxides, carbonates and mixtures of these are best prepared for catalytic purposes by heating the oxalates of the metals either alone or in admixtures, the chemical nature of the product being dependent upon the metals whose oxalates are employed. I have discovered that the thermal decomposition products of the oxalates of those metals suitable for use as catalytic bodies possess, when properly prepared, exceptional merit as catalysts and are more efficient for this purpose than similar catalytic bodies prepared by the usual methods.

In order to prepare an active catalytic mass, according to my invention, the oxalates which are desired are first prepared by known methods. The oxalate or mixture of oxalates is then slowly heated to the decomposition temperature, care being taken that this temperature is not greatly exceeded, as the catalytic value of the resulting product may be injured by excessive heating. The temperature required varies with the oxalate used, but in general, a temperature between 200° and 600° C. is satisfactory. The heating operation may be conducted in an atmosphere of a non-oxidizing nature, such as hydrogen, carbon monoxide or a mixture of these gases, or an inert gas, such as nitrogen or carbon dioxide. In other cases an oxidizing atmosphere, such as air or oxygen may be employed. In case an oxalate is being used which normally produces a metal when heated, the heating operation is usually best performed in an atmosphere which does not allow free access of air or other oxidizing gases. It is understood, however, that the nature of the gases is generally immaterial in that they are not, per se, primarily active in the formation of the catalyst. It is only necessary that the decomposition of the oxalate be carried out in an atmosphere such as will not deleteriously affect the catalyst formed by the decomposition.

In some cases the thermal decomposition products obtained by heating the oxalate are too light and fluffy for direct use as a catalytic body. In such cases it is preferable to bring the catalytic body into suitable granular form by briquetting or by any other available means which does not introduce harmful impurities.

My invention may also be used for the preparation of supported catalysts. In order to prepare catalytic bodies of this general type, a solution of the oxalate may be prepared and this solution poured over some suitable porous insoluble material, the catalytic body being formed by heating to decompose the oxalate as already described. In the case of an insoluble oxalate, it may be precipitated on the supporting material and then heated to cause decomposition of the oxalate. Where it is desired to produce a supported catalytic body in which the active portion consists of a mixture of active metals, oxides, or carbonates, the required mixture of oxalates is prepared. This mixture is distributed upon the supporting material in any suitable way, and the whole is heated until the oxalates present have been decomposed.

The advantages to be derived by following the process described are several. The oxalates of the heavy metals are crystalline compounds, for the most part insoluble in water and therefore are more easily filtered, washed and prepared in a state of purity than are the hydroxides or carbonates heretofore used. Upon gentle heating gaseous products are evolved, leaving a residue of great porosity and consisting of elementary metal, oxide, or carbonate, or mixtures of any of these, depending upon the chemical properties of the metal of the oxalate. The product is free from elementary carbon, organic, resinous or other deleterious substances. Whereas the preparation of a catalytic metal by reduction of the oxide requires several hours exposure to the reducing agent; the same result may now be accomplished in much less time. In the admixture of alkali metal carbonates with other catalytic materials, the use of the oxalate of the alkali metal produces a more porous surface than might otherwise be obtained on account of the deliquescence of other forms of the alkali metal, such as the carbonate or hydroxide. In addition, the outstanding advantage of the catalytic bodies prepared by thermal decomposition of the oxalates, or mixtures of the oxalates as described above, consists in the marked increase in catalytic activity of such catalysts when compared with the activity of similar products prepared by the usual methods of the art. Other advantages will appear from the more detailed description of the invention.

In general, for the purposes of this invention, oxalates may be separated into several more or less distinct groups, depending upon the metals of which they are formed. The oxalates of those metals whose oxides are most easily reduced by hydrogen, for example, the oxalates of silver, copper, and cadmium, yield the elementary metal in a spongy form when heated, while the oxalates of metals whose oxides are less easily reduced, for example, the oxalates of iron, cobalt, and nickel, yield mixtures of the elementary metals and their lower oxides. Oxalates of another class are those whose corresponding oxides are not reducible by hydrogen according to the usual procedure. Oxalates of this class are represented by those of chromium, zinc, manganese, aluminum, titanium and magnesium, which yield the corresponding oxides. Of still another class are the oxalates of those metals whose carbonates are stable under the conditions of heating, notably the exalates of sodium, potassium, lithium, calcium, strontium, barium, or other alkali or alkali earth metals. These yield carbonates when treated in the same manner as would yield oxides, metals, or mixtures of these in the case of the other elements described above. It is not claimed that the oxalates of all metals must necessarily fall wholly within one of the classes outlined, for the carbonate of a metal may be only partly destroyed by the conditions of treatment of the oxalate, in which case the product of heating the oxalate would contain not only oxide but carbonate as well. Or, under certain conditions, copper produced by heating copper oxalate may contain a small amount of cuprous oxide, in which case the products would be classified with those resulting from heating the oxalates of iron and nickel. In other words, the classification of oxalates according to their products of decomposition is only approximate.

It is not intended to limit the preparation of contact masses by the methods herein described to the use of oxalates of single metals, for useful and important results are obtained by employing mixtures in widely varying proportions of oxalates of various metals which may be either of the same or different types. For example, a mixture of the oxalates of zinc and of copper may be employed for the preparation of a catalyst for the synthesis of methanol or other oxygenated organic compounds from hydrogen and oxides of carbon at elevated temperatures and pressures. A catalyst prepared by heating a mixture of chromium and zinc oxalates is useful for this same reaction or for the dehydrogenation of alcohols. Valuable catalysts comprising an admixture of alkali metal carbonates with metals or metallic oxides or both, may be prepared from an intimate mixture of the oxalates by heat treatment to produce the active catalyst. A contact mass prepared by heating the copper and nickel oxalates, is useful in the hydrogenation of oils, for the dehydrogention of alcohols, for the hydrogenation of olefins, or other gaseous reactions.

Important and useful catalytic materials may consist of metals, oxides, or carbonates derived from oxalates mixed with other substances or compounds not so derived. The mixtures may be made either before heating to decompose the oxalate or after the heat treatment, the metal, oxide, or carbonate so derived being used in place of the ordinary less active variety.

The oxalates of the desired metals may be prepared by any of the well known methods. Those of the heavy metals, which are generally insoluble in water may be prepared by precipitation from hot or cold solutions of soluble salts of the metals, such as the nitrates or acetates, using solutions of oxalic acid or any soluble oxalates. The soluble oxalates of the alkali metals may be prepared by neutralization of the hydroxides or carbonates with oxalic acid. Oxalates may be prepared by any other methods known to the art without departing from the spirit of this invention, provided that such preparations are free from impurities which will exert a deleterious effect upon the resulting catalyst preparation. The extent of such deleterious effects and the nature of the substances causing them are, of course, dependent upon the nature of the catalytic material and the use to which it is to be put.

In the employment of mixtures of oxalates, it is important, although not absolutely necessary, to obtain the oxalates in as intimate a mixture as possible, an objective which is generally best attained by co-precipitation of the oxalates of the water insoluble variety, or by impregnation of such insoluble oxalates with solutions of the soluble ones. After drawing, the mixtures thus obtained may be treated as already has been indicated.

The catalytic materials which are the subjects of this invention, are particularly applicable to the synthesis of methanol or other oxygenated organic compounds from hydrogen and carbon monoxide when the reaction is carried out at pressures between one atmosphere and 1000 atmospheres and temperatures ranging from 200° to 600° C., but, of course, need not be restricted to these conditions, or even this reaction. For example, a catalyst consisting of zinc oxide, either alone or in combination with copper, silver, magnesium oxide, beryllium oxide, aluminum oxide, titanium oxide, chromium oxide, calcium carbonate, or bismuth oxide, when prepared according to the method of this invention is a suitable catalyst for methanol synthesis. When these same catalysts are prepared with an alkali metal or alkali earth metal content, especially that derived from potassium oxalate, in the manner described, notable amounts of oxygenated organic compounds having molecular weights greater than that of methanol may be obtained under the same conditions.

As a catalyst for the dehydrogenation of alcohols, such as the preparation of acetaldehyde from ethanol, good results are obtained with copper, iron, zinc oxide, or a mixture of zinc oxide and chromium oxide, when prepared by heating the oxalates.

Contact materials may be prepared by the method described, which are useful, in addition to the reactions already described, for the hydrogenation of fats, oils, or olefins, the cracking of petroleum, dehydration of alcohols with the formation of ethers or olefins, catalysts of organic condensations, for the conversion of carbon monoxide and steam to hydrogen and carbon dioxide, for the synthesis or oxidation of ammonia, for the methanation of oxides of carbon, or for any other catalytic processes involving the use of solid metals, oxides, carbonates or mixtures thereof.

Having stated the nature of the invention, the following specific examples are given to show the preparation of certain catalysts and some of the results obtained therewith.

*Example 1*

A catalyst mass is prepared by heating pure zinc oxalate in air at 370–400° C. for 4 hours, after which the resulting fine powder is briquetted to a suitable granular form. 100 cc. of this preparation when placed in a copper-lined tube capable of withstanding high pressures, yields a distillate containing 70 cc. of pure methanol per hour from a gas consisting essentially of 2 volumes of hydrogen and 1 volume of carbon monoxide, when the reaction is carried out at a temperature of 380° C. and a pressure of 290 atmospheres, the gaseous mixture being passed through the contact mass at the rate 1,000 liters per hour measured under ordinary conditions.

As indicating the improvement resulting from the use of the oxalate in preparing a zinc oxide catalyst, catalysts prepared in the customary manner by heating zinc hydroxide or carbonate or by the hydrolysis of zinc isopropoxide yield under similar conditions only 10, 23, and 18 cc. pure methanol, respectively, per 100 cc. catalyst per hour.

*Example 2*

A solution containing equal parts by weight of zinc nitrate and copper nitrate is precipitated at a temperature of 70° C. with a solution containing an excess of ammonium oxalate. The precipitate is filtered, washed, dried, and heated in an atmosphere of hydrogen to a temperature of 400° C. 100 cc. of the resulting product, when used as described in Example 1, yields 135 cc. of pure methanol per hour at a temperature of 360° C.

*Example 3*

A mixture of chromium and zinc oxalates is prepared by precipitation from a solution containing equimolecular proportions of the nitrates by addition of sufficient ammonium oxalate solution. After filtering and washing, the mixture is heated in nitrogen or air at a temperature of 400 ° C. Such a contact mass produces 85 cc. of methanol per hour per 100 cc. of catalyst when used according to the conditions described in Example 1. Good results are also obtained with other proportions of the two oxides, for example, 3 moles of zinc oxide and 1 mole of chromium oxide when prepared as described above.

*Example 4*

In the dehydrogenation of ethanol, a two gram sample of zinc oxide prepared by heating zinc oxalate to 400° C. in air, effected the decomposition of 4.5 grams of ethanol per hour when the vapor of the latter compound was passed through a tube heated to 400° C., at the rate of 35 grams per hour. As indicating the improvement resulting from the use of the oxalate in preparing the zinc oxide catalyst, catalysts prepared by heating the carbonate and by hydrolysis of the isopropoxide under similar conditions decompose only 2.2 and 3.1 grams of the alcohol per hour, respectively.

*Example 5*

A catalyst for the dehydrogenation of ethanol or other alcohols is prepared by heating in place in the catalyst tube 2 grams of copper oxalate. At 325° C. such a catalyst caused the formation of 5 grams of acetaldehyde per hour from ethanol vapor which was passed through the tubes.

I claim:

1. A catalyst which comprises an active body containing a metallic oxide and a carbonate, formed by the thermal decomposition of a mixture of oxalates, said mixture including an oxalate which normally decomposes to form an oxide and an oxalate which normally decomposes to form a carbonate.

2. A catalyst which comprises an active body containing a metal, a metallic oxide and a carbonate, formed by the thermal decomposition of a mixture of oxalates, said mixture including an oxalate which normally decomposes to form a metal, an oxalate which normally decomposes to form an oxide, and an oxalate which normally decomposes to form a carbonate.

3. A zinc oxide-containing catalyst which comprises an active body formed by the thermal decomposition of zinc oxalate in an oxidizing atmosphere.

4. A zinc oxide catalyst containing a carbonate, which comprises an active body formed by the thermal decomposition of a mixture of oxalates, said mixture including zinc oxalate and an oxalate which normally decomposes to form a carbonate.

5. A zinc oxide catalyst containing an alkaline carbonate, which comprises an active body formed by the thermal decomposition of a mixture of zinc oxalate and an alkali-metal oxalate.

6. A zinc oxide catalyst containing a carbonate and a metal which comprises an active body formed by the thermal decomposition of a mixture of zinc oxalate, an oxalate which normaly decomposes to form a metal, and an oxalate which normally decomposes to form a carbonate.

7. A zinc oxide catalyst containing potassium carbonate which comprises the active body formed by the thermal decomposition of a mixture containing zinc oxalate and potassium oxalate.

8. A zinc oxide-containing catalyst which comprises an active body formed by the thermal decomposition of a mixture of the oxalates of a plurality of metals, including zinc oxalate.

9. A zinc oxide catalyst containing chromium oxide which comprises an active body formed by the thermal decomposition of a mixture of oxalates containing zinc oxalate and chromium oxalate.

10. A zinc oxide catalyst containing an alkali-metal carbonate and a metallic oxide which comprises an active body formed by the thermal decomposition of a mixture of oxalates, said mixture containing zinc oxalate, an alkali-metal oxalate and an oxalate which decomposes to form an oxide.

11. In a catalytic process for hydrogenating an oxygen-containing carbon compound, the step of using as a catalyst, a catalytically active body containing a metallic oxide prepared by subjecting an oxalate to thermal decomposition in an oxidizing atmosphere.

12. In a catalytic process for hydrogenating an oxygen-containing carbon compound, the step of using as the catalyst a catalytically active body containing a metallic oxide and a carbonate prepared by subjecting to thermal decomposition a mixture of oxalates, said mixture including an oxalate which normally decomposes to form an oxide, and an oxalate which normally decomposes to form a carbonate.

13. In a catalytic process for hydrogenating an oxygen-containing carbon compound, the step of using as the catalyst a catalytically active body containing a metallic oxide, a metal and a carbonate, said body being obtained by subjecting to thermal decomposition a mixture of oxalates, said mixture including an oxalate which normally decomposes to form a metallic oxide, an oxalate which normally decomposes to form a metal, and an oxalate which normally decomposes to form a carbonate.

14. In a process of synthesizing oxygenated organic compounds by passing hydrogen and oxides of carbon over a catalyst at elevated temperature and pressure, the step of using as a catalyst, a catalytically active body containing a substantially non-reducible metallic oxide prepared by subjecting an oxalate to thermal decomposition.

15. In a process of synthesizing oxygenated organic compounds by passing hydrogen and oxides of carbon over a catalyst at elevated temperature and pressure, the step of using as the catalyst, a catalytically active body containing a metallic oxide and a carbonate prepared by subjecting to thermal decomposition a mixture of oxalates, said mixture including an oxalate which normally decomposes to form an oxide which is substantially non-reducible, and an oxalate which normally decomposes to form a carbonate.

16. In a process of synthesizing oxygenated organic compounds by passing hydrogen and oxides of carbon over a catalyst at elevated temperature and pressure, the step of using as the catalyst, a catalytically active body containing a metallic oxide, a metal and a carbonate, said body being obtained by subjecting to thermal decomposition a mixture of oxalates, said mixture including an oxalate which normally decomposes to form a substantially non-reducible metallic oxide, an oxalate which normally decomposes to form a metal, and an oxalate which normally decomposes to form a carbonate.

17. In a process of synthesizing oxygenated organic compounds by passing hydrogen and oxides of carbon over a catalyst at elevated temperature and pressure, the step of using as a catalyst a catalytically active body containing zinc oxide, said body having been obtained by subjecting zinc oxalate to thermal decomposition.

18. In a process of synthesizing oxygenated organic compounds by passing hydrogen and oxides of carbon over a catalyst at elevated temperature and pressure, the step of using as the catalyst a catalytically active body containing zinc oxide and an alkali-metal carbonate, said body being obtained by subjecting to thermal decomposition a mixture of oxalates containing zinc oxalate and an alkali-metal oxalate.

19. In a process of synthesizing oxygenated organic compounds by passing hydrogen and oxides of carbon over a catalyst at elevated temperature and pressure, the step of using as the catalyst a catalytically active body containing zinc oxide, a carbonate and a metal, said body being obtained by subjecting to thermal decomposition a mixture of oxalates containing zinc oxalate, an oxalate which decomposes to form a carbonate, and an oxalate which decomposes to form a metal.

20. In a process of synthesizing oxygenated organic compounds by passing hydrogen and oxides of carbon over a catalyst at elevated temperature and pressure, the step of using as the catalyst a catalytically active body containing zinc oxide and potassium carbonate, said body being obtained by subjecting to thermal decomposition a mixture containing zinc oxalate and potassium oxalate.

21. In a process of synthesizing oxygenated organic compounds by passing hydrogen and oxides of carbon over a catalyst at elevated temperature and pressure, the step of using as the catalyst a catalytically active body containing a metal and an oxide of the metal, said body being obtained by subjecting to thermal decomposition a metallic oxalate.

22. In a process of synthesizing oxygenated organic compounds by passing hydrogen and oxides of carbon over a catalyst at elevated temperature and pressure, the step of using as the catalyst a catalytically active body containing substantially non-reducible metallic oxides, said body being obtained by the thermal decomposition of a mixture of metallic oxalates.

23. In a process of synthesizing oxygenated organic compounds by passing hydrogen and oxides of carbon over a catalyst at elevated temperature and pressure, the step of using as the catalyst a catalytically active body containing zinc oxide, said body being obtained by the thermal decomposition of a mixture of the oxalates of a plurality of metals, including zinc oxalate.

24. In a process of synthesizing oxygenated organic compounds by passing hydrogen and oxides of carbon over a catalyst at elevated temperature and pressure, the step of using as the catalyst a catalytically active body containing zinc oxide and chromium oxide, said body being obtained by subjecting to thermal decomposition a mixture of oxalates including zinc oxalate and chromium oxalate.

25. In a process of synthesizing oxygenated organic compounds by passing hydrogen and oxides of carbon over a catalyst at elevated temperature and pressure, the step of using as the catalyst a catalytically active body containing zinc oxide and a carbonate, said body being obtained by subjecting to thermal decomposition a mixture of oxalates, said mixture including zinc oxalate and an oxalate which normally decomposes to form a carbonate.

26. In a process of synthesizing methyl alcohol and alcohols of higher molecular weight by passing hydrogen and oxides of carbon over a catalyst at elevated temperature and pressure, the step of using as the catalyst a catalytically active body containing zinc oxide, an alkali-metal carbonate and a metallic oxide, said body being obtained by subjecting to thermal decomposition a mixture of oxalates containing zinc oxalate, an alkali-metal oxalate, and an oxalate which normally decomposes to form a substantially non-reducible metallic oxide.

27. In the process of synthesizing methyl alcohol and alcohols of higher molecular weight by passing hydrogen and oxides of carbon over a catalyst at elevated temperature and pressure, the step of using as the catalyst a catalytically active body containing zinc oxide, an alkali-metal carbonate and a metal, said body being obtained by subjecting to thermal decomposition a mixture of oxalates containing zinc oxalate, an alkali-metal oxalate and an oxalate which normally decomposes to form a metal.

28. In a process of synthesizing oxygenated organic compounds by passing hydrogen and oxides of carbon over a catalyst at elevated temperature and pressure, the step of using as the catalyst a catalytically active body containing zinc oxide, an alkali-metal carbonate and an alkaline earth carbonate, said body being obtained by subjecting to thermal decomposition a mixture of oxalates containing zinc oxalate, an alkali-metal oxalate and an alkaline earth oxalate.

29. In a process of synthesizing methyl alcohol and alcohols of higher molecular weight by passing hydrogen and oxides of carbon over a catalyst at elevated temperature and pressure, the step of using as the catalyst a catalytically active body containing zinc oxide, said body being formed by the thermal decomposition of zinc oxalate.

30. In a process of synthesizing methyl alcohol and alcohols of higher molecular weight by passing hydrogen and oxides of carbon over a catalyst at elevated temperature and pressure, the step of using as the catalyst a catalytically active body containing zinc oxide and a carbonate, said body being obtained by subjecting to thermal decomposition a mixture of oxalates containing zinc oxalate and an oxalate which decomposes to form a carbonate.

31. In a process of synthesizing methyl alcohol and alcohols of higher molecular weight by passing hydrogen and oxides of carbon over a catalyst at elevated temperature and pressure, the step of using as the catalyst a catalytically active body containing zinc oxide and potassium carbonate, said body being obtained by the thermal decomposition of a mixture of oxalates containing zinc oxalate and potassium oxalate.

32. In a process of synthesizing methyl alcohol and alcohols of higher molecular weight by passing hydrogen and oxides of carbon over a catalyst at elevated temperature and pressure, the step of using as the catalyst a catalytically active body containing substantially non-reducible metallic oxides, said body being formed by the thermal decomposition of a mixture of metallic oxalates.

33. In a process of synthesizing methyl alcohol and alcohols of higher molecular weight by passing hydrogen and oxides of carbon over a catalyst at elevated temperature and pressure, the step of using as the catalyst a catalytically active body containing zinc oxide, said body being obtained by subjecting to thermal decomposition a mixture of oxalates of a plurality of metals, including zinc oxalate.

34. In a process of synthesizing methyl alcohol and alcohols of higher molecular weight by passing hydrogen and oxides of carbon over a catalyst at elevated temperature and pressure, the step of using as the catalyst a catalytically active body containing zinc oxide and chromium oxide, said body being obtained by subjecting to thermal decomposition a mixture of oxalates containing zinc oxalate and chromium oxalate.

35. In a catalytic process of forming organic compounds in a three-component reaction system, comprising an oxygen-containing carbon compound capable of hydrogenation, an oxygen-containing carbon compound capable of dehydrogenation, and hydrogen, the step which comprises using as the catalyst a metallic oxide prepared by subjecting an oxalate to thermal decomposition in an oxidizing atmosphere.

36. The invention of claim 35 in which the metallic oxide is a difficultly reducible oxide.

37. In a catalytic process for hydrogenating an oxygen-containing carbon compound, the step of using as a catalyst a catalytically active body containing a difficultly reducible metallic oxide prepared by subjecting an oxalate to thermal decomposition in an oxidizing atmosphere.

In testimony whereof I affix my signature.

WILBUR A. LAZIER.

CERTIFICATE OF CORRECTION.

Patent No. 1,746,781.　　　　　　　　　　Granted February 11, 1930, to

WILBUR A. LAZIER.

It is hereby certified that error appears in the printed specification of the above numbered patent requiring correction as follows: Page 3, line 20, for the word "drawing" read "drying"; same page, line 60, for the word "catalysts" read "catalysis"; and that the said Letters Patent should be read with these corrections therein that the same may conform to the record of the case in the Patent Office.

Signed and sealed this 18th day of March, A. D. 1930.

(Seal)

M. J. Moore,
Acting Commissioner of Patents.